(12) United States Patent
Uesugi

(10) Patent No.: US 8,677,102 B2
(45) Date of Patent: Mar. 18, 2014

(54) INSTRUCTION FUSION CALCULATION DEVICE AND METHOD FOR INSTRUCTION FUSION CALCULATION

(75) Inventor: Takahiko Uesugi, Yamanashi (JP)

(73) Assignee: NEC Corporation, Tokyo (JP)

( * ) Notice: Subject to any disclaimer, the term of this patent is extended or adjusted under 35 U.S.C. 154(b) by 594 days.

(21) Appl. No.: 12/782,618

(22) Filed: May 18, 2010

(65) Prior Publication Data

US 2010/0299505 A1 Nov. 25, 2010

(30) Foreign Application Priority Data

May 20, 2009 (JP) ................................. 2009-121807

(51) Int. Cl.
- *G06F 7/38* (2006.01)
- *G06F 9/00* (2006.01)
- *G06F 9/44* (2006.01)
- *G06F 15/00* (2006.01)

(52) U.S. Cl.
USPC ........................................................ 712/220

(58) Field of Classification Search
None
See application file for complete search history.

(56) References Cited

U.S. PATENT DOCUMENTS

| 5,604,878 | A | 2/1997 | Colwell et al. | |
|---|---|---|---|---|
| 6,675,376 | B2 * | 1/2004 | Ronen et al. | 717/151 |
| 2002/0087955 | A1 * | 7/2002 | Ronen et al. | 717/151 |
| 2009/0248779 | A1 * | 10/2009 | Brooks et al. | 708/523 |
| 2010/0115248 | A1 * | 5/2010 | Ouziel et al. | 712/226 |

FOREIGN PATENT DOCUMENTS

| JP | 4-112328 A | 4/1992 |
|---|---|---|
| JP | 6-59861 A | 3/1994 |
| JP | 7-56735 A | 3/1995 |
| JP | 7-105002 A | 4/1995 |
| JP | 7-262005 A | 10/1995 |
| JP | 9-311786 A | 12/1997 |
| JP | 11-238001 A | 8/1999 |
| JP | 2000020310 A | 1/2000 |

OTHER PUBLICATIONS

Japanese Office Action for JP Application No. 2009-121807 mailed on Sep. 24, 2013 with English Translation.

* cited by examiner

*Primary Examiner* — Corey S Faherty
(74) *Attorney, Agent, or Firm* — Sughrue Mion, PLLC

(57) ABSTRACT

An instruction fusion calculation device of the present invention includes an instruction fusion detection circuit, an instruction fusion circuit, and a calculator. The instruction fusion detection circuit determines whether or not a fusion of a preceding instruction and a subsequent instruction that have a flow dependence relationship between them can be made. The instruction fusion circuit fuses the preceding instruction and the subsequent instruction to which it is determined by the instruction fusion detection circuit that the instructions can be fused into one instruction. The calculator executes the fused instruction into which the instructions are fused by the instruction fusion circuit to output the calculation result and outputs at least one of the calculation results obtained by executing the preceding instruction and the subsequent instruction as an intermediate result.

12 Claims, 11 Drawing Sheets

Fig.2

| ⟨USUAL OPERATION⟩ | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| INSTRUCTION 1: fmp S3←S1*S2 | IF | DEC | IS | RD | EX1 | EX2 | WD | | | | | | | | | |
| INSTRUCTION 2: fmp S5←S3*S4 | IF | DEC | IS | RS | RS | RS | RS | RD | EX1 | EX2 | WD | | | | | |
| INSTRUCTION 3: fad S6←S3+S4 | | IF | DEC | IS | RS | RS | RS | RD | EX1 | EX2 | WD | | | | | |
| INSTRUCTION 4: fad S8←S6+S7 | | | IF | DEC | IS | RS | RS | RS | RS | RS | RS | RD | EX1 | EX2 | WD | |

TIMING

Fig.3

<OPERATION IN WHICH ONLY INSTRUCTION PASSING IS EXECUTED : INSTRUCTION 3 PASSES INSTRUCTION 2>

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| INSTRUCTION 1 | fmp S3←S1*S2 | IF | DEC | DEC | IS | RD | EX1 | EX2 | WD | | | | | | | | |
| INSTRUCTION 2 | fmp S5←S3*S4 | IF | IR | DEC | IS | RS | RS | RD | RD | RD | EX1 | EX2 | WD | | | | |
| INSTRUCTION 3 | fad S6←S3+S4 | | IF | DEC | IS | RS | RS | RD | RD | RD | EX1 | EX2 | WD | | | | |
| INSTRUCTION 4 | fad S8←S6+S7 | | | IF | DEC | IS | RS | RD | RD | RD | RD | RD | RD | RD | EX1 | EX2 | WD |

TIMING

Fig.4

<OPERATION IN WHICH INSTRUCTION PASSING AND INSTRUCTION FUSION ARE EXECUTED (THE NUMBER OF PORTS OF A GENERAL-PURPOSE REGISTER IS INCREASED BY FOUR AND WRITING IS EXECUTED); AN INSTRUCTION 1' INTO WHICH THE INSTRUCTION 1 AND THE INSTRUCTION 3 ARE FUSED IS CREATED>

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| INSTRUCTION 1 | fma S3←S1*S2 | IF | DEC | DEC | IS | RD | EX1 | EX2 | WD | | | | | | | |
| INSTRUCTION 3 | fma S6←S3+S4 | | IF | DEC | IS | RS | RS | RS | RS | RD | EX1 | EX2 | WD | | | |
| INSTRUCTION 2 | fmp S5←S3*S4 | | IF | IR | DEC | IS | RS | RS | RS | RS | RD | EX1 | EX2 | WD | | |
| INSTRUCTION 4 | fad S9←S6+S7 | | | IF | IR | DEC | IS | RS | RS | RS | RS | RD | EX1 | EX2 | WD | |

WRITING IS PERFORMED BY USING FOUR PORTS OF A GENERAL-PURPOSE REGISTER

TIMING

Fig.6

(OPERATION IN WHICH INSTRUCTION PASSING AND INSTRUCTION FUSION ARE EXECUTED AND A REPLY PATH OF ANOTHER CALCULATOR IS USED (THE NUMBER OF WRITING PORTS OF A GENERAL-PURPOSE REGISTER IS NOT INCREASED : AN INSTRUCTION 1' INTO WHICH THE INSTRUCTION 1 AND THE INSTRUCTION 3 ARE FUSED IS CREATED.)

| | | | | | | | | | | | TIMING | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| INSTRUCTION 1' | IF | DEC | DEC | IS | RD | EX1 | EX2 | WD | | | | | | | | |
| INSTRUCTION 3 fma S3←S1*S2 | | | | | | | | | | | | | | | | |
| INSTRUCTION 3 fma S6←S3+S4 | IF | DEC | IR | DEC | IS | RS | RS | RS | RS | | | | | | | |
| INSTRUCTION 2 fmp S5←S3*S4 | IF | IR | DEC | IS | RD | EX1 | EX2 | WD | | | | | | | | |
| INSTRUCTION 4 fad S8←S6+S7 | | IF | DEC | IS | RS | RS | RS | RS | RD | EX1 | EX2 | WD | WD | | | |

A START TIMING OF WRITING A CALCULATION RESULT IS DELAYED BY ONE TIMING BECAUSE OF COLLISION OF WRITING TO A GENERAL-PURPOSE REGISTER

Fig.7

<OPERATION IN WHICH INSTRUCTION PASSING AND INSTRUCTION FUSION ARE EXECUTED AND A BYPASS PASS IS USED>

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| INSTRUCTION 1' | fms S3←S1*S2 | IF | DEC | DEC | IS | RD | EX1 | EX2 | WD | | | | | | | | |
| INSTRUCTION 3 | fma S8←S3+S4 | | IF | DEC | | | | | | | | | | | | | |
| INSTRUCTION 2 | fmp S5←S3*S4 | IF | IR | IR | DEC | IS | RS | RD | EX1 | EX2 | WD | WD | | | | | |
| INSTRUCTION 4 | fad S6←S6+S7 | | IF | DEC | IS | RS | RS | RD | EX1 | EX2 | WD | WD | | | | | |

TIMING

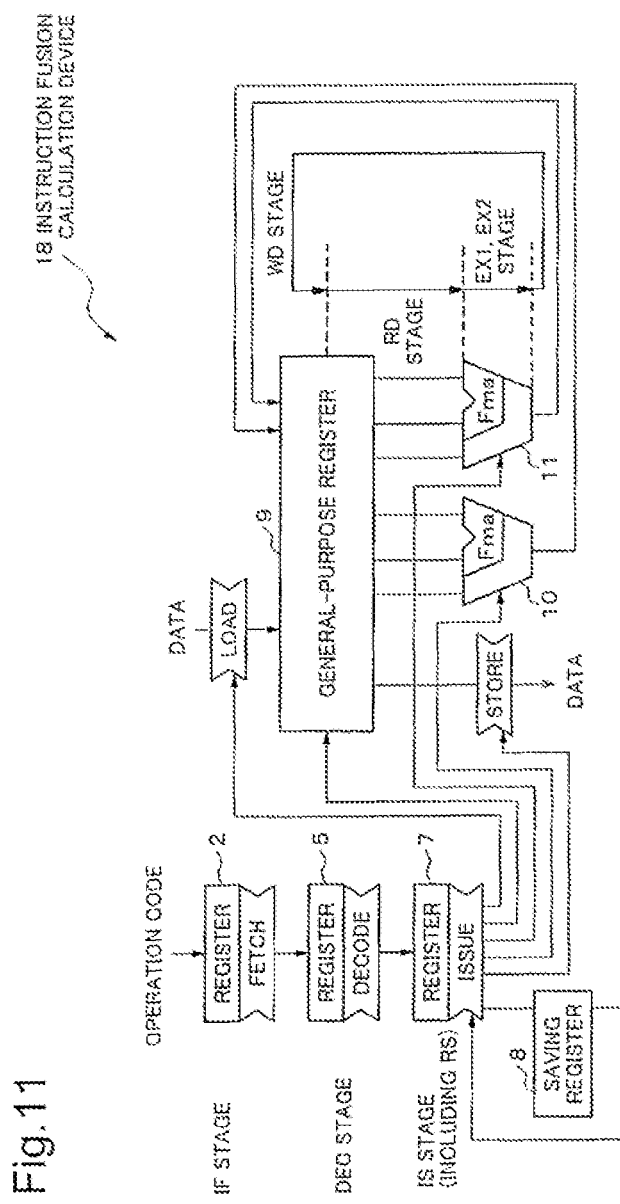

INSTRUCTION FUSION CALCULATION DEVICE AND METHOD FOR INSTRUCTION FUSION CALCULATION

This application is based upon and claims the benefit of priority under Article 4.D(1) of the Paris Convention from Japanese Patent Application No. 2009-121807, filed on May 20, 2009, the disclosure of which is incorporated herein in its entirety by reference.

TECHNICAL FIELD

The present invention relates to an instruction fusion calculation device and a method for instruction fusion calculation and in particular relates to an instruction fusion calculation device that can shorten a processing time without requiring a complicated process and a method for instruction fusion calculation.

BACKGROUND ART

Usually, when an instruction calculation device executes a calculation of an instruction sequence comprising four instructions as shown below, first, an instruction 1 is executed and next, an instruction 2 and an instruction 3 are executed by referring to the calculation result obtained by executing the instruction 1.

instruction 1: fmp S3←S1*S2
instruction 2: fmp S5←S3*S4
instruction 3: fad S6←S3+S4 instruction 4: fad S8←S6+S7

Where fmp (Floating Multiply) represents floating point multiplication and fad (Floating Add) represents floating point addition.

In this method, the instruction 2 and the instruction 3 are executed by using the calculation result obtained by executing the instruction 1. Therefore, the instruction calculation device cannot execute the instruction 2 and the instruction 3 before the completion of the execution of the instruction 1. The above-mentioned instruction sequence can be rewritten as the following instruction sequence by using a multiply-add instruction if the to instruction calculation device includes a fused multiply-adder that is a combined calculator to execute the multiply-add instruction.

instruction 1: fmp S3←S1*S2
instruction 2: fmp S5←S3*S4
instruction 3': fad S6←S1*S2+S4
instruction 4: fad S8←S6+S7

In the above-mentioned instruction sequence, the instruction 3 is replaced with the instruction 3' that is the multiply-add instruction. This is a difference between two instruction sequences mentioned above. In other words, when the instruction calculation device calculates this instruction sequence, a data processing has to be performed according to an order in which data is generated based on the relation between the data. Therefore, when the instruction calculation device executes this instruction sequence, the effect of shortening the processing time of the instruction calculation device is not obtained. In other words, when the instruction sequence in which the dependency relationship exists between a plurality of instructions is executed, even if a part of the instructions in the instruction sequence is replaced with a combined instruction such as the multiply-add instruction, the speed up of the calculation cannot be realized.

A calculation device in which an order of execution of instructions is changed between a process of a final loop of an instruction loop in which an instruction sequence A is repeated a plurality of times and an initialization process of an instruction sequence B subsequently executed after the execution of the instruction sequence A is disclosed in the Japanese Patent Application Laid-Open No. 2000-020310 (hereinafter, referred to as patent publication 1). The calculation device disclosed in this patent publication performs "instruction passing" in which one instruction is executed before executing another instruction which is initially decided to be executed before executing the one instruction. For this purpose, in an instruction issuance control device, a class bit representing whether data passing between instructions is executed or not is provided in a predetermined field of a format in which an instruction code is arranged. A technology with which the instruction issuance control device controls whether to execute the instruction passing by using the class bit has been disclosed. However, in the technology disclosed in patent publication 1, a user man-hour is required to arrange the class bit representing whether or not the dependency relationship of the data exists between the instructions in the predetermined field of the instruction in advance.

A technology with which a preceding store instruction is merged with a subsequent store instruction by store data merging means is disclosed in Japanese Patent Application Laid-Open No. 1992-112328 (hereinafter, referred to as patent publication 2).

A simulator which simulates a parallel calculation processing is disclosed in Japanese Patent Application Laid-Open No. 1999-238001 (hereinafter, referred to as patent publication 3). The patent publication discloses a simulation method with which an order of the calculation is determined based on a length of an execution cycle as an example of a simulation method.

The patent publications 2 and 3 do not disclose a technology to determine whether or not the dependency relationship of the data exists between the instructions without performing a particular process in advance.

SUMMARY

The object of the present invention is to provide an instruction fusion calculation device which can shorten a processing time of an instruction calculation device without performing a complicated process in the instruction calculation device with respect to an execution of a preceding instruction and a subsequent instruction that have a flow dependence relationship in which the subsequent instruction is executed by using a calculation result stored in a register to where the preceding executed instruction is written and a method for instruction fusion calculation.

The object of the present invention is to provide the instruction fusion calculation device that can shorten the execution time of the preceding instruction and the subsequent instruction that have the flow dependence relationship between them and the method for instruction fusion calculation.

In order to achieve the above-mentioned object, the instruction fusion calculation device of the present invention includes an instruction fusion detection circuit which determines whether or not the fusion of the preceding instruction and the subsequent instruction that have the flow dependence relationship between them can be made, an instruction fusion circuit which fuses the preceding instruction and the subsequent instruction determined by the instruction fusion detection circuit that the instructions can be fused into the preceding instruction, and a calculator which executes the one instruction into which the instructions are fused by the instruction fusion circuit, outputs the calculation result, and outputs at least one of the calculation results obtained by executing the preceding instruction and the subsequent instruction as an intermediate result.

In order to achieve the above-mentioned object, the method of the present invention includes: fusing the preceding instruction and the subsequent instruction determined by the instruction fusion detection circuit for determining whether or not a fusion of the preceding instruction and the subsequent instruction that have the flow dependence relationship between them can be made to be fused into the preceding instruction, and executing the fused instruction, outputting the calculation result, and outputting at least one of the calculation results obtained by executing the preceding instruction and the subsequent instruction as an intermediate result.

BRIEF DESCRIPTION OF THE DRAWINGS

FIG. 2 shows a time chart of execution of an instruction sequence in an instruction fusion calculation device that is generally used.

FIG. 3 shows a time chart in a case in which only an instruction passing is executed in an instruction fusion calculation device according to a first exemplary embodiment of the present invention.

FIG. 4 shows a time chart of execution of an instruction sequence in an instruction fusion calculation device according to a first exemplary embodiment of the present invention.

FIG. 6 shows a time chart of execution of an instruction sequence in an instruction fusion calculation device according to a third exemplary embodiment of the present invention.

FIG. 7 shows a time chart of execution of an instruction sequence in an instruction fusion calculation device according, to a fourth exemplary embodiment of the present invention.

FIG. 11 shows a circuit configuration of an instruction fusion calculation device that is generally used.

EXEMPLARY EMBODIMENT

The instruction fusion calculation device of the present invention includes a fusion instruction detection circuit which determines whether a fusion of instructions to be executed can be made, an instruction fusion circuit which fuses the instructions to which it is determined by the fusion instruction to detection circuit that the instructions can be fused, and a calculator which executes the instruction as a basic component.

Exemplary embodiments of the present invention will be described below, with respect to a case in which the instruction passing is executed, a case in which a plurality of calculators are used, and a case in which a general-purpose register is used.

Figure 1:
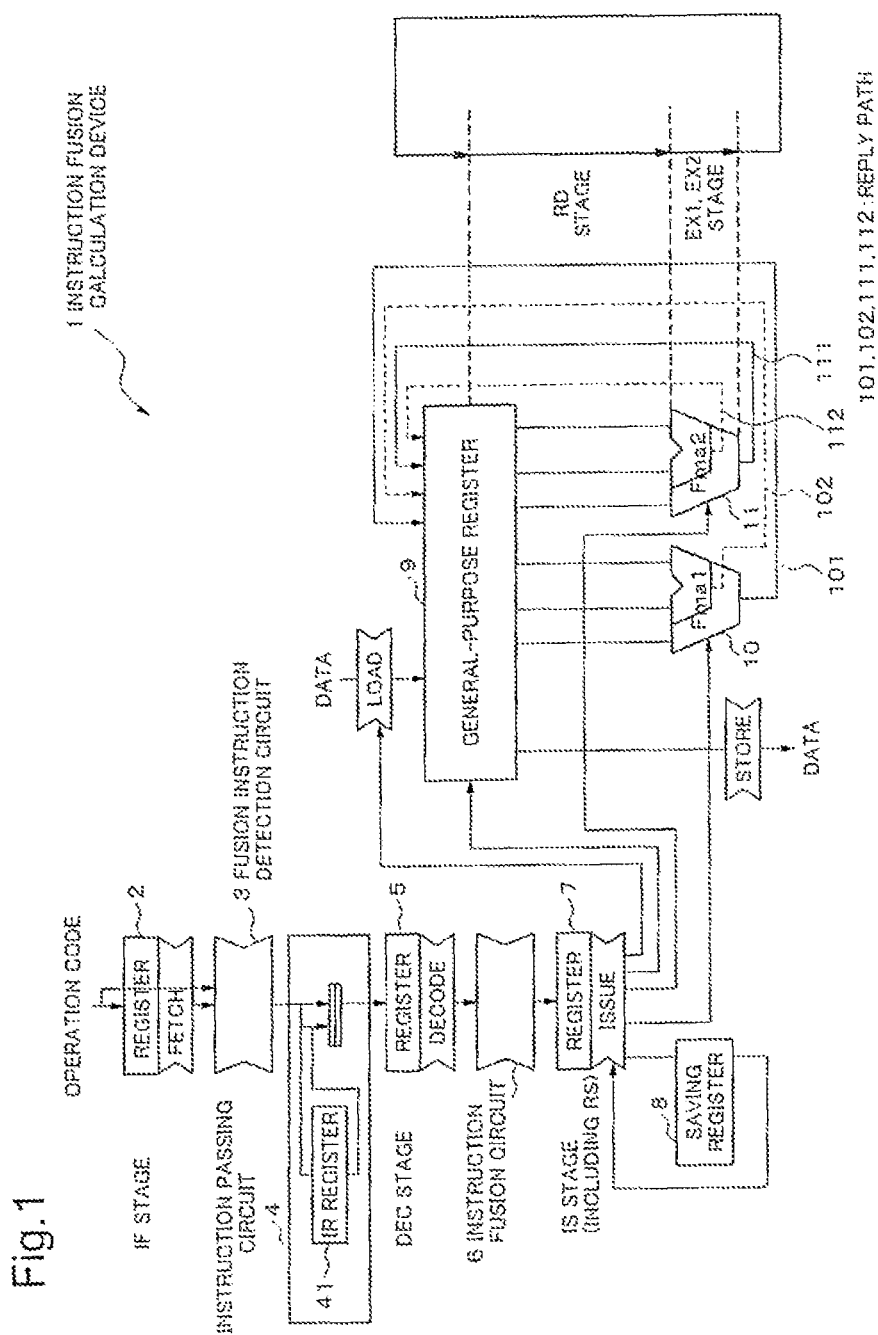
FIG. 1 shows a circuit configuration of an instruction fusion calculation device according to a first exemplary embodiment of the present invention.

FIG. 1 is a circuit configuration of an instruction fusion calculation device according to a first exemplary embodiment of, the present invention.

An instruction fusion calculation device 1 includes a fusion instruction detection circuit 3, an instruction passing circuit 4, an instruction fusion circuit 6, a saving register 8, a general-purpose register 9 having four writing ports, fused multiply-adders 10 and 11, and registers 2, 5 and 7. The instruction passing circuit 4 includes an IR (Instruction Reservation) register 41.

In FIG. 1, Fma represents a Fused multiply-adder.

An outline of the operation of the instruction fusion calculation device according to the exemplary embodiment will be described with reference to FIG. 1.

The fusion instruction detection circuit 3 performs a check of whether or not the fusion of the preceding instruction and the subsequent instruction can be made at an IF (Instruction Fetch) stage. When it is determined that the instructions can be fused, an instruction passing mechanism of the instruction passing circuit 4 executes the instruction passing even if the flow dependence relationship exists. As a result, the frequency of the fusion of the instructions can be increased. Further, in this exemplary embodiment, when one of two instructions is an addition instruction and the other is a multiplication instruction, and two instructions have the flow dependence relationship between them, the fusion instruction detection circuit 3 determines that the fusion of the instructions can be made by the instruction fusion circuit 6 (because the fused multiply-adder that can fuse the addition instruction and the multiplication instruction that have the flow dependence relationship is used). However, the exemplary embodiment of the present invention is not limited to this configuration. Even when two instructions that have the flow dependence relationship are two addition instructions or two multiplication instructions, the fusion of the two instructions can be made by using the combined calculator available for each case.

When it is determined that the fusion of the instructions can be made, the instruction fusion circuit 6 fuses the preceding instruction and the subsequent instruction, replaces the two instructions with one fused instruction, and stores the fused instruction in the register 7 at a DEC (Decode: instruction decoding) stage.

Next, the instruction fusion circuit 6 checks a resource required for the issuance of the instruction and instructs the register 7 to issue the fused instruction if it is determined that the instruction can be issued at an IS (Issue: instruction issuance) stage.

On the other hand, when the register 7 cannot issue the fused instruction just after the instruction is received, the instruction fusion circuit 6 stores the fused instruction in the saving register 8 until the fused instruction can be issued (RS (Reservation) stage).

When the fused instruction is issued from the register 7, the fused multiply-adders 10 and 11 read out the data designated by the instruction stored in the register 7 from the general-purpose register 9 at a RD (Read Data: data reading) stage.

Next, the fused multiply-adders 10 and 11 perform a calculation process designated by the instruction stored in the register 7 at an EX1 (Execution 1: instruction execution) stage and an EX2 (Execution 2: instruction execution) stage. After that, the intermediate result of the calculation and the final result of the calculation are written into the general-purpose register by using a reply path indicated by dotted lines (102 and 112) and solid lines (101 and 111) at a WD (Write Data: data writing) stage, respectively. In this exemplary embodiment, the fused multiply-adder is designed so as to output the intermediate result in addition to the final result obtained by executing the fused instruction. Further, the other setting can be used instead of this setting for example, the intermediate result of the calculation and the final result of the calculation are written into the general-purpose register by using the reply path indicated by the solid lines (101 and 111) and the dotted lines (102 and 112), respectively.

Next, the operation of this exemplary embodiment will be described in detail with reference to FIG. 1.

First, the register 2 fetches an operation code of the subsequent instruction at the IF stage.

Next, the fusion instruction detection circuit 3 checks the dependency relationship with the preceding instruction based on the operation code. When the fusion of one instruction and the preceding instruction that have the flow dependence relationship between them can be made if the one instruction is executed before executing the other instruction preceding the one instruction, the instruction fusion detection circuit 3 determines that the fusion of the instructions can be made. The fusion instruction detection circuit 3 makes the instruction passing circuit 4 perform the passing process in which the other instruction is passed by the one instruction. Namely, the instruction passing circuit 4 temporarily holds the other instruction preceding the one instruction in the IR register 41 and preferentially executes the one instruction that is the subsequent instruction.

The register 5 in the DEC stage holds instruction information which passes through the instruction passing circuit 4, and decodes the instruction information to obtain required information. The instruction fusion circuit 6 converts two instructions to which it is determined that the fusion of the two instructions can be made based on the decoding result into one fused instruction and these instructions are set as fused instruction information.

Next, the register 7 in the IS stage holds the fused instruction information, checks whether a resource required to start the execution of the fused instruction exists sufficiently in the instruction fusion calculation device and issues the instruction when the resource can be secured.

If the resource cannot be secured in the instruction fusion calculation device 1 and the fused instruction cannot be immediately issued by the register 7, the saving register 8 holds the fused instruction information until the issuance can be made (RS stage).

When the fused instruction is issued by the register 7, the fused multiply-adders 10 and 11 read out the data specified by an operand of the instruction from the general-purpose register 9 by using a bypass selector. (RD Stage)

After that, an instruction which instructs the fused multiply-adders 10 and 11 to execute the instruction is issued by the register 7 and the fused multiply-adders 10 and 11 perform a calculation process at the EX1 stage and the EX2 stage. The calculation result and the intermediate result obtained by the fused multiply-adder 10 are written into the general-purpose register 9 via the reply path 101 and the reply path 102, respectively (WD stage). Similarly, the calculation result and the intermediate result obtained by the fused multiply-adder 11 are written into the general-purpose register 9 via the reply path 111 and the reply path 112, respectively.

In the instruction fusion calculation device according to this exemplary embodiment, the fused multiply-adders 10 and 11 are used. However, it is not limited to fused multiply-adders and the other combined calculators may be used.

Next, the operation of this exemplary embodiment will be described by using the following instruction sequence in contrast with a configuration that is generally used.

(Instruction Sequence)
instruction 1: fmp S3<-S1*S2
instruction 2: fmp S5<-S3*S4
instruction 3: fad S6<-S3+S4
instruction 4: fad S8<-S6+S7

FIG. 11 shows a circuit configuration of an instruction fusion calculation device 18 that is generally used. The instruction fusion calculation device 18 includes the registers 2, 5 and 7, the saving register 8, the general-purpose register 9 and the fused multiply-adders 10 and 11.

FIG. 2 shows a time chart of execution of the above-mentioned instruction sequence in the instruction fusion calculation device.

The register 2 performs a fetch (IF) of the instruction 1 and the instruction 2 at a timing 1.

The register 5 performs the decoding (DEC) of the instruction 1 and the instruction 2 at a timing 2 and the register 5 performs the issuance (IS) of the instruction 1 and the instruction 2 at a timing 3. Because the instruction 1 and the instruction 2 have the flow dependence relationship between them, the instruction 2 waits in the register 7 at the RS stage until the calculation result is obtained by executing the instruction 1 by the fused multiply-adders 10 and 11 at a timing 7. The register 7 issues the instruction 2 at a timing 8 and the fused multiply-adders 10 and 11 read out the calculation result data of the instruction 1 from the general-purpose register 9. The fused multiply-adders 10 and 11 execute the instruction 2 based on the calculation result data at a timing 9 and a timing 10. The fused multiply-adders 10 and 11 write the calculation result obtained by executing the instruction 2 in the general-purpose register 9 at a timing 11.

The instruction 3 and the instruction 4 are fetched (IF) from the register 2 at the timing 2. The instruction 3 and the instruction 4 are decoded (DEC) by the register 5 at the timing 3 and issuance (IS) is performed by the register 5 at the timing 4.

The instruction 3 and the instruction 1 have the flow dependence relationship between them, and the instruction 4 and the instruction 3 have the flow dependence relationship between them. The instruction 3 waits in the register 7 at the RS stage until the calculation result is obtained by executing the instruction 1 by the fused multiply-adders 10 and 11. The instruction 4 waits in the register 7 at the RS stage until the calculation result is obtained by executing the instruction 3 by the fused multiply-adders 10 and 11. The fused multiply-adders 10 and 11 read out the calculation result data of the instruction 1 from the general-purpose register 9 at the timing 8 and the fused multiply-adders 10 and 11 perform a calculation by executing the instruction 3 at the timing 9 and the timing 10. The fused multiply-adders 10 and 11 restore the calculation result data of the instruction 3 in the general-purpose register 9 at a timing 11.

The fused multiply-adders 10 and 11 read out the calculation result data of the instruction 3 from the general-purpose register 9 at a timing 12 and the fused multiply-adders 10 and 11 perform a calculation by executing the instruction 4 at a timing 13 and a timing 14. The fused multiply-adders 10 and 11 restore the calculation result data of the instruction 4 in the general-purpose register 9 at a timing 15.

Next, a time chart of execution of the above-mentioned instruction sequence in the instruction fusion calculation device according to this exemplary embodiment will be described.

Because the instruction 1 and the instruction 2 have the flow dependence relationship between them and both instructions are the multiply instructions, the fusion of the instruction 1 and the instruction 2 cannot be made when the fused multiply-adder is used. The subsequent instruction 3 and the instruction 1 have the flow dependence relationship between them, the instruction 3 is the addition instruction and the instruction 1 is the multiplication instruction. Therefore, the fusion of the instruction 3 and the instruction 1 can be made. When the fusion of the instruction 3 and the instruction 1 can be made, the passing process is required in which the instruction 3 passes the instruction 2.

In order to clarify the effect of the instruction fusion process, first, a case in which only the passing process is performed will be described by using FIG. 3.

FIG. 3 shows a time chart in a case in which one particular instruction is passed by another particular instruction with respect to the above-mentioned instruction sequence. In this exemplary embodiment, the fusion of the instructions is not executed.

The register 2 performs the fetch (IF) of both the instruction 1 and the instruction 2 at the timing 1. The instruction 2 is fetched to the instruction passing circuit 4 at the timing 2 and stored in the IR register 41.

In order to match the timing of the instruction 1 with the timing of the instruction 3, the instruction 1 waits at the DEC stage until the timing 3. In a case in which the fusion of the instructions is not made as shown in FIG. 2, the instruction 1 moves to the DEC stage at the timing 2 and moves to the next stage at the timing 3. Accordingly, when the instruction passing is executed between instructions (FIG. 3), the timing of the completion of the execution of the instruction 1 is delayed by one timing in comparison with a case in which the instruction passing is not executed between instructions (FIG. 2). The operations executed after this are executed with a delay of one timing.

Next, FIG. 4 shows a time chart in a case in which both an instruction passing process and an instruction fusion process are executed. In FIG. 4, the register 2 performs the fetch (IF) of both the instruction 1 and the instruction 2 at the timing 1. The instruction 2 and the instruction 1 have the flow dependence relationship between them and both instructions are multiplication instructions. Therefore, the fusion of the instruction 2 and the instruction 1 cannot be made when the fused multiply-adder is used. On the other hand, the subsequent instruction 3 and the instruction 1 have the flow dependence relationship between them and the instruction 3 is the addition instruction. Therefore, the fusion of the instruction 3 and the instruction 1 can be made.

Accordingly, the instruction 2 is fetched to the instruction passing circuit 4 at the timing 2 and stored in the IR register 41.

When the instruction 2 is passed by the subsequent instruction 3, the instruction fusion circuit can fuse the instruction 1 and the instruction 3. In order to match the timing of the instruction 1 with the timing of the instruction 3, the instruction 1 waits at the DEC stage until the timing 3. After the instruction 3 is decoded at the DEC stage at the timing 3, the fusion of the decoded instruction 3 and the waiting instruction 1 is made by the instruction fusion circuit 6.

The fused instruction is issued (IS) from the register 7 at the timing 4. The fused multiply-adders 10 and 11 read out (RD) the calculation target data from the general-purpose register 9 at the timing 5 and the data are executed (EX1 and EX2) by the fused multiply-adders 10 and 11 at the timing 6 and the timing 7. The fused multiply-adders 10 and 11 write (WD) the calculation result into the general-purpose register 9 at the timing 8.

As it is clear from FIG. 4, the timing at which the calculation result obtained by executing the instruction 1' that is the fused instruction into which the instruction 1 and the instruction 3 are fused is written into the general-purpose register 9 is early by three timings in comparison with the timing at which the calculation result obtained by executing the instruction 3 that is not fused with the instruction 1 is written into the general-purpose register 9 (shown in FIG. 2).

On the other hand, the instruction 2 moves to the DEC stage from the IR register 41 at the timing 4, a decoding process thereof is performed, and the decoded instruction 2 waits at the RS stage until the timing 8 at which the calculation result is obtained by executing the fused instruction 1'. The fused multiply-adders 10 and 11 read out the calculation target data from the general-purpose register 9 at the timing 9. The fused multiply-adders 10 and 11 perform the calculation process to the data at the EX1 stage and the EX2 stage at the timing 10 and the timing 11 and write the calculation result into the general-purpose register 9 at the timing 12.

The instruction 4 is fetched (IF) to the register 2 at the timing 2 and the decoding (DEC) process thereof is performed at the timing 3. After that, the instruction 4 that has the flow dependence relationship with the preceding instruction 3 waits at the RS stage until the timing 8 will start at which the calculation result can be obtained by executing the preceding instruction 3 (becomes the instruction 1' after the instruction 3 is fused with the instruction 1). After that, the fused multiply-adders 10 and 11 read out the calculation target data from the general-purpose register 9 at the timing 9. The fused multiply-adders 10 and 11 perform the calculation process to data at the EX1 stage and the EX2 stage at the timing 10 and the timing 11 and write the calculation result into the general-purpose register 9 at the timing 12.

The instruction fusion calculation device described above in which both the instruction passing process and the instruction fusion process are performed can complete the calculation faster than the calculation device in which only the passing process is performed (shown in FIG. 3).

As mentioned above, in this exemplary embodiment, the fusion of the preceding instruction and the subsequent instruction located after the preceding instruction that have the flow dependence relationship between them is made. Further, a passing of data between instructions having the flow dependence relationship is performed not via the general-purpose register but via the combined calculator such as the fused multiply-adder without performing the passing of the data. Therefore, the instruction fusion calculation device according to this exemplary embodiment has advantages that a user does not need to perform a complicated process and that the processing time thereof can be shortened. Further, by changing an order of execution of instructions by performing the instruction passing process, the fusion of instructions can be applied to not only two consecutive instructions but also the instructions which have one or more instructions between them.

Figure 5:
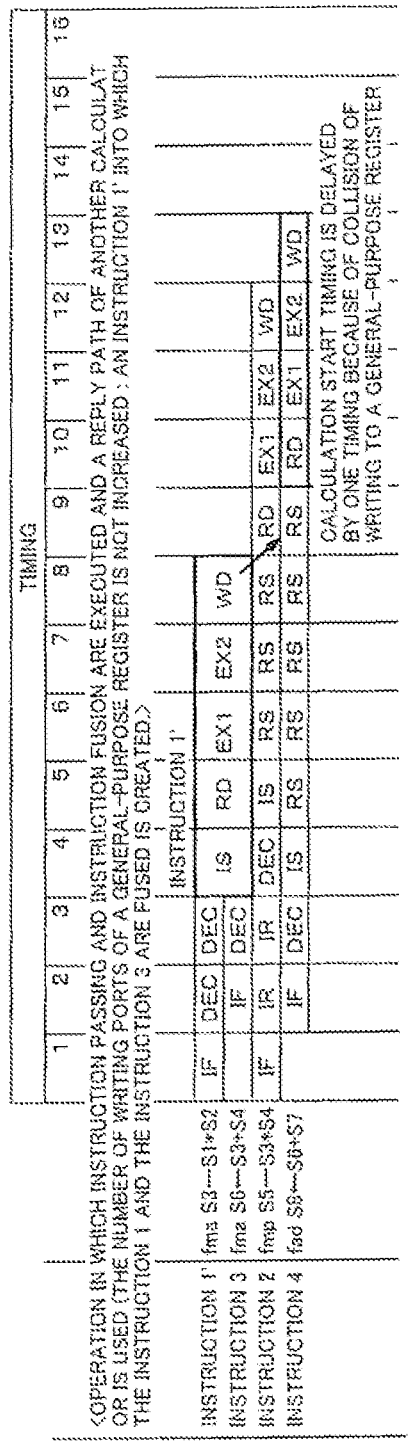
FIG. 5 shows a time chart of execution of an instruction sequence in an instruction fusion calculation device according to a second exemplary embodiment of the present invention.
Figure 8:
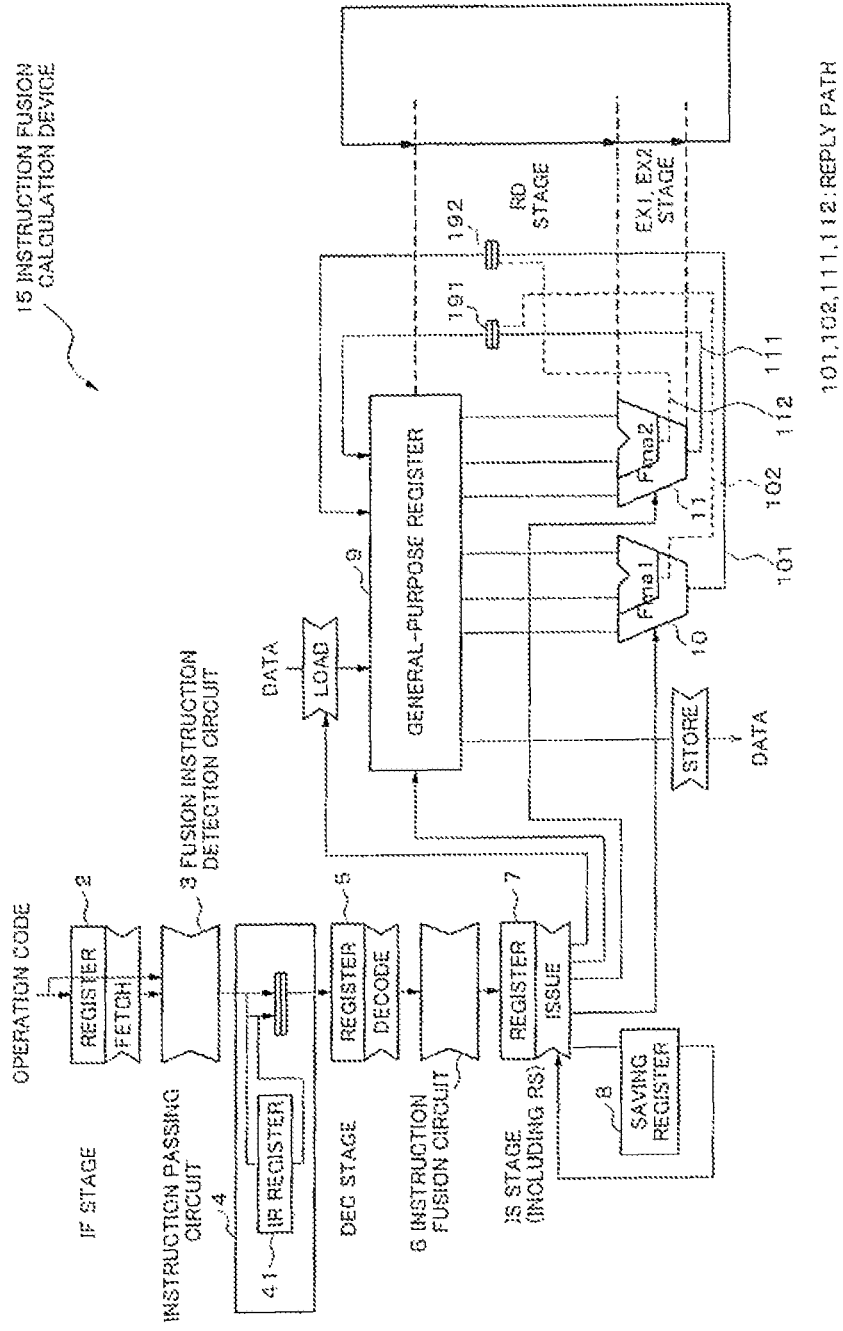
FIG. 8 shows a circuit configuration of the instruction fusion calculation device according to a second exemplary embodiment of the present invention.

Next, an instruction fusion calculation device according to a second exemplary embodiment will be described in which the number of the writing ports of the general-purpose register 9 is smaller than the number of the reply paths. The reply paths are aggregated so as to match the number of the reply paths with the number of the writing ports of the general-purpose register 9, and bypass selectors 191 and 192 are provided at the aggregated position. Namely, as shown in FIG. 8, the reply path of the calculation result of the fused multiply-adder 10 and the reply path of the intermediate result of the fused multiply-adder 11 are aggregated and the reply path of the intermediate result of the fused multiply-adder 10 and the reply path of the calculation result of the fused multiply-adder 11 are aggregated and the bypass selectors 191 and 192 are provided at the aggregated position. By using this configuration, when one fused multiply-adders does not use the reply path, the other fused multiply-adder can write the calculation result into the general-purpose register 9 by using a part in which the reply paths are aggregated. FIG. 5 shows a time chart of execution of the instruction sequence in the instruction fusion calculation device according to this exemplary embodiment.

Operations from the timing 1 to the timing 8 in FIG. 5 are the same as operations from the timing 1 to the timing 8 in the time chart shown in FIG. 4. When the fused multiply-adders 10 and 11 write the calculation results obtained by executing the instruction 2 and the instruction 4 into the general-purpose register 9 at the same timing, a part of the calculation results cannot be written into the general-purpose register 9 because the fused multiply-adders 10 and 11 have a total of four reply paths but the general-purpose register 9 has only two writing ports. For this reason, the fused multiply-adders 10 and 11 execute the instruction 4 at a timing that is delayed by one timing from the timing at which the instruction 2 is executed. Namely, the fused multiply-adders 10 and 11 perform a process so that the result obtained by executing the instruction 2 is written in the general-purpose register 9 at the timing 12 and the result obtained by executing the instruction 4 is written in the general-purpose register 9 at the timing 13. In this case, a setting can be made in which either the calculation result or the intermediate result of the fused multiply-adder 10 is selected or either the calculation result or the intermediate result of the fused multiply-adder 11 is selected as the data written into the general-purpose register 9 by using the bypass selectors 191 and 192.

The instruction fusion calculation device according to the second exemplary embodiment has the same advantage as the instruction fusion calculation device according to the first exemplary embodiment and further has an advantage in which collision of the writing can be avoided without increasing the number of the writing ports of the general-purpose register 9.

Next, an instruction fusion calculation device according to a third exemplary embodiment will be described. In this embodiment, the number of the writing ports of the general-purpose register is not increased and the writing operation is waited until the reply path becomes available in the fusion calculation process of which the instruction passing process and the instruction fusion process are combined.

Figure 9:
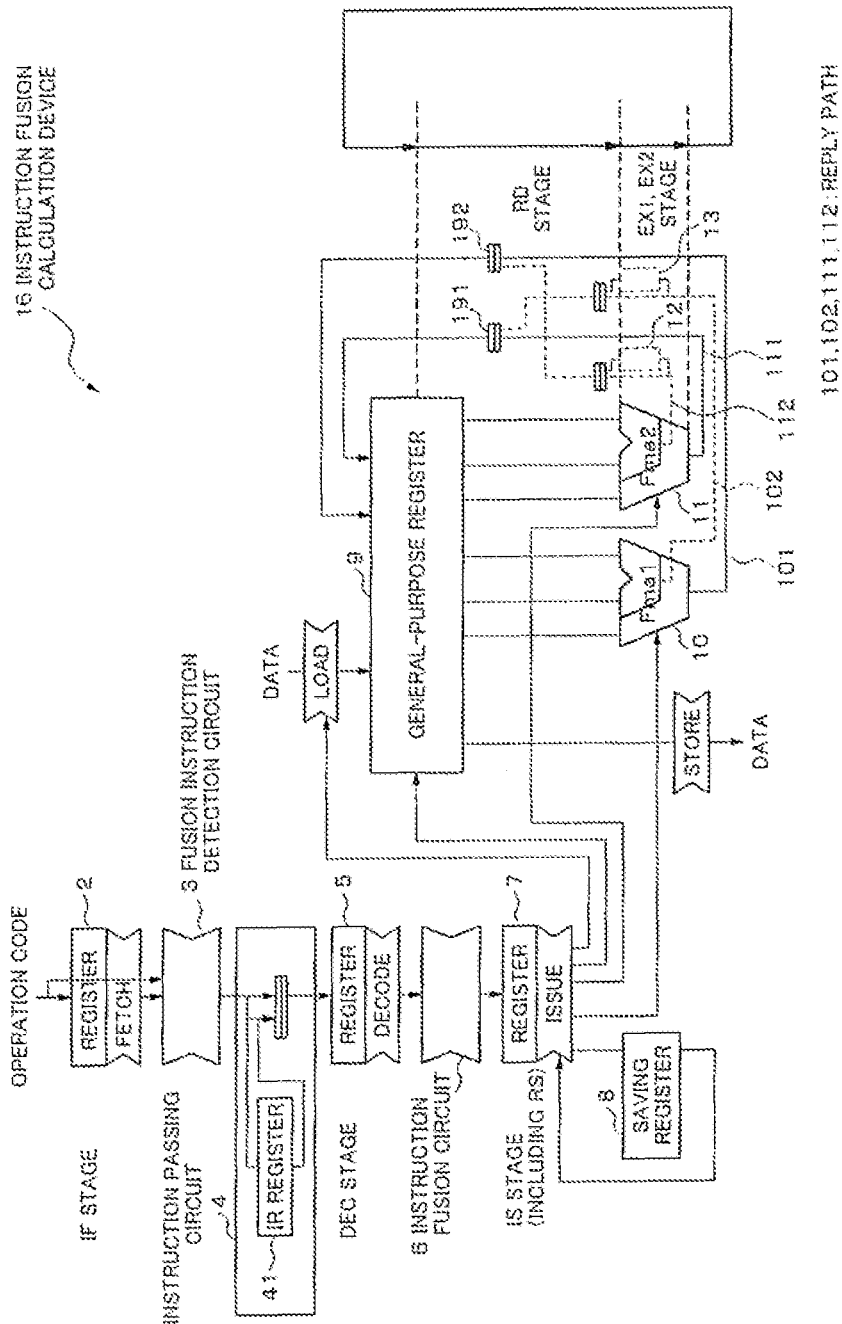
FIG. 9 shows a circuit configuration of the instruction fusion calculation device according to a third exemplary embodiment of the present invention.

FIG. 9 shows a circuit configuration of an instruction fusion calculation device 16 of the exemplary embodiment. Buffers 12 and 13 are provided on the reply path in the third exemplary embodiment. This differs from the second exemplary embodiment (FIG. 8).

FIG. 6 shows a time chart of execution of the instruction sequence in the instruction fusion calculation device according to this exemplary embodiment.

An execution of the instruction 1' shown in FIG. 6, that is the fused instruction into which the instruction 1 and the instruction 3 are fused shown, is the same as the execution of the instruction 1' shown in FIG. 5. The fused multiply-adders 10 and 11 execute the instruction 2 and the instruction 4 at the same timing. Accordingly, the collision on the writing port of the general-purpose register 9 occurs at the timing 12 because the fused multiply-adders 10 and 11 use a total of four reply paths to output the calculation result but the general-purpose register 9 has only two writing ports.

However, the fused multiply-adders 10 and 11 can hold the data in the buffers 12 and 13 provided on the path for the intermediate result represented by the dotted line among the reply paths shown in FIG. 9, respectively. Consequently, even when the instruction 2 and the instruction 4 are executed at the same timing by the fused multiply-adders 10 and 11, the data can be held in the buffers 12 and 13 until the timing 13 at which the collision will not occur. The fused multiply-adders 10 and 11 write the data in the buffers 12 and 13 into the general-purpose register 9 at the timing 13.

The instruction fusion calculation device according to the third exemplary embodiment has the same advantage as the instruction fusion calculation device according to the second exemplary embodiment.

Next, an instruction fusion calculation device according to a fourth exemplary embodiment will be described in which the number of the writing ports of the general-purpose register is smaller than the number of the reply paths like the third exemplary embodiment but a configuration different from that of the third exemplary embodiment is used. Namely, the instruction fusion calculation device according to this exemplary embodiment has the same configuration as the instruction fusion calculation device according to the third exemplary embodiment but in the device, the result calculated by the fused multiply-adder is sent to the input of the fused multiply-adder directly. A configuration in which a function of a bypass is added to the function of the fused multiply-adders 10 and 11 in a configuration (of the third exemplary embodiment) in which the data waits in the buffers 12 and 13 until the reply path becomes available will be described below.

Figure 10:
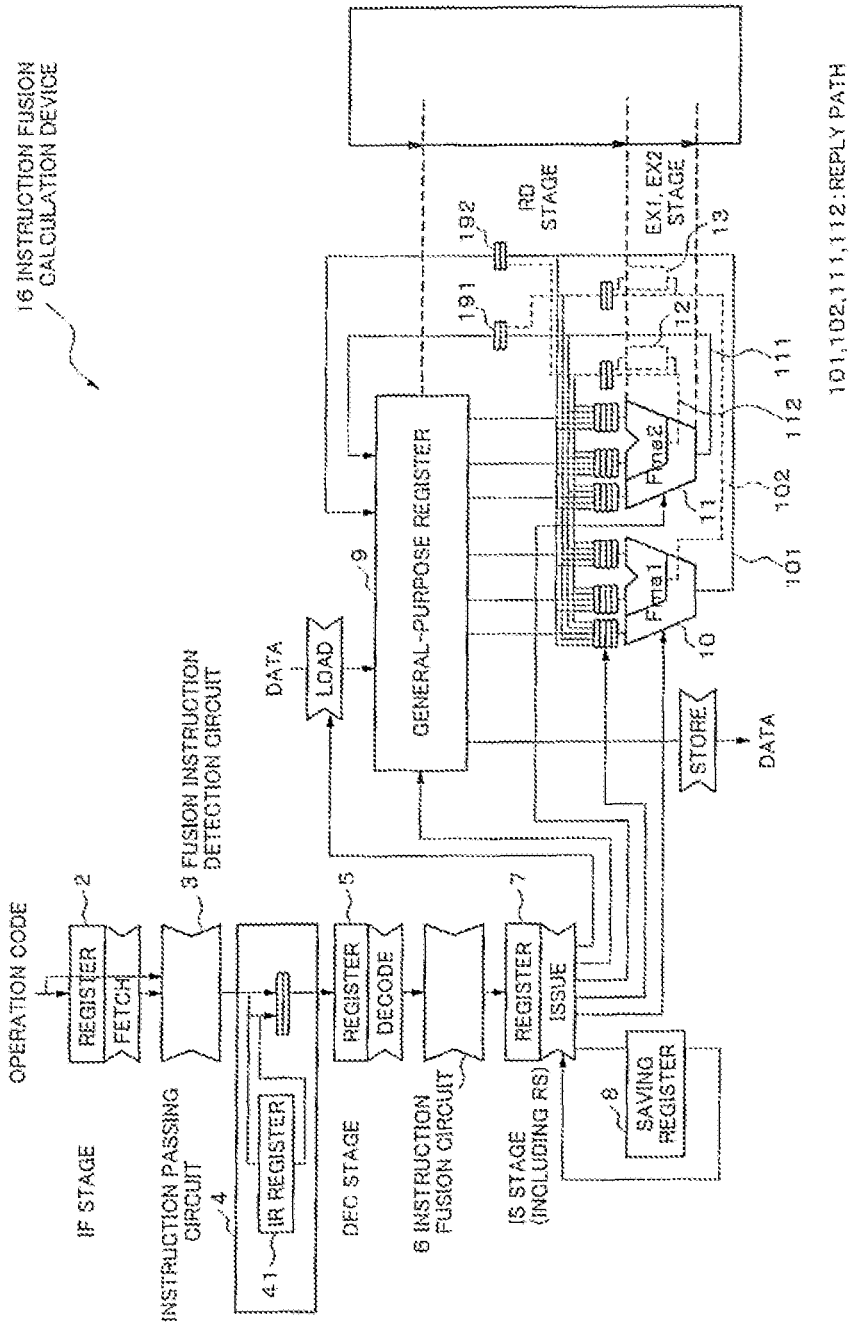
FIG. 10 shows a circuit configuration of the instruction fusion calculation device according to a fourth exemplary embodiment of the present invention.

FIG. 10 shows a circuit configuration of an instruction fusion calculation device 17 of this exemplary embodiment. The bypass paths 141 to 144 are provided in the instruction fusion calculation device 17. This is a difference between the third exemplary embodiment and the fourth exemplary embodiment.

FIG. 7 shows a time chart of execution of the instruction sequence in the instruction fusion calculation device according to this exemplary embodiment.

In a process performed by a calculation fusion device which performs the instruction passing process and fuses the instructions, the calculation result and the intermediate result of the fused multiply-adders 10 and 11 are directly sent to the input of the fused multiply-adders 10 and 11 via the bypasses 141 to 144. Consequently, the fused multiply-adders 10 and 11 can obtain the calculation result and the intermediate result obtained by executing the instruction 1' at the timing 7. When the instruction 2 and the instruction 4 that have the flow dependence relationship with the instruction 1' are executed, the fused multiply-adders 10 and 11 set the calculation result obtained by executing the instruction 1' at the timing 8. Whereby the calculation results obtained by executing the instruction 2 and the instruction 4 are obtained at the timing 9. A part of the calculation results cannot be written into the general-purpose register because the fused multiply-adders 10 and 11 have a total of four reply paths to output the calculation result but the general-purpose register has only two writing ports. The data of such calculation result which cannot be written into the general-purpose register can be held in the buffers 12 and 13 provided on the path for the intermediate result. Accordingly, the instruction 2 and the instruction 4 can be executed by the fused multiply-adders 10 and 11 at the same timing. The fused multiply-adders 10 and 11 perform a writing process to the general-purpose register 7 at the timing 11 at which the writing port is available after a preceding writing process has been performed.

The instruction fusion calculation device according to this exemplary embodiment has an advantage in which a processing time can be further shortened in comparison with the instruction fusion calculation device according to the first to the third exemplary embodiments because the bypasses 141 to 144 are provided for directly sending the calculation result of the fused multiply-adders 10 and 11 to the input of the fused multiply-adders 10 and 11.

Four exemplary embodiments have been described above, the exemplary embodiment of the present invention is not limited to these, and variations of the present invention are possible without departing from the scope of the invention.

What is claimed is:

1. An instruction fusion calculation device comprising:
    an instruction fusion detection circuit to determine whether or not fusion of a preceding instruction and a subsequent instruction located after the preceding instruction that have a flow dependence relationship can be made;
    an instruction fusion circuit to fuse the preceding instruction and the subsequent instruction to which it is determined by said instruction fusion detection circuit that the instructions can be fused into one instruction;
    a calculator to execute the one instruction into which the instructions are fused by the instruction fusion circuit to output the calculation result and outputting at least one of the calculation results obtained by executing the preceding instruction and the subsequent instruction as an intermediate result; and
    an instruction passing circuit for changing an order of execution of instructions so that when another instruction exists between the preceding instruction and the subsequent instruction to which it is determined that the instructions can be fused in an instruction sequence, the subsequent instruction is executed before executing the another instruction.

2. The instruction fusion calculation device according to claim 1, wherein the instruction fusion detection circuit determines that the fusion of the preceding instruction and the subsequent instruction can be made when one of the following conditions is satisfied:
    the preceding instruction is a multiplication instruction and the subsequent instruction is an addition instruction;
    the preceding instruction is the addition instruction and the subsequent instruction is the multiplication instruction;
    the preceding instruction and the subsequent instruction are the addition instructions; or
    the preceding instruction and the subsequent instruction are the multiplication instructions
    and when the preceding instruction and the subsequent instruction have a flow dependence relationship between them.

3. The instruction fusion calculation device according to claim 1 comprising
    a general-purpose register to which an output of the calculator is inputted and
    a buffer provided on a reply path for connecting the calculator and the general-purpose register.

4. The instruction fusion calculation device according to claim 3, wherein when the number of reply paths is greater than the number of writing ports of the general-purpose register, the reply paths are aggregated so as to match the number of the reply paths with the number of the writing ports of the general-purpose register.

5. The instruction fusion calculation device according to claim 1, wherein a plurality of calculators are used and timings at which the plurality of calculators start execution are differentiated from each other.

6. The instruction fusion calculation device according to claim 1, wherein an input side of the calculator is connected to an output side thereof by a bypass path and a calculation result of the calculator is directly sent to an input of the calculator via said bypass path.

7. A method for instruction fusion calculation comprising
    fusing a preceding instruction and a subsequent instruction into one instruction to which it is determined by an instruction fusion detection circuit for determining whether or not a fusion of the preceding instruction and the subsequent instruction that have a flow dependence relationship between them can be made that the instructions can be fused; and
    executing the fused instruction to output the calculation result and outputting at least one of the calculation results obtained by executing the preceding instruction and the subsequent instruction as an intermediate result,
    wherein an order of execution of instructions is changed so that when another instruction exists between the preceding instruction and the subsequent instruction to which it is determined that the instructions can be fused the subsequent instruction is executed before executing the another instruction prior to the execution of the fusion.

8. The method for instruction fusion calculation according to claim 7, wherein it is determined that the preceding instruction and the subsequent instruction can be fused when one of the following conditions is satisfied at the time of the execution of the fusion:
    the preceding instruction is a multiplication instruction and the subsequent instruction is an addition instruction;
    the preceding instruction is the addition instruction and the subsequent instruction is the multiplication instruction;
    the preceding instruction and the subsequent instruction are the addition instructions; or
    the preceding instruction and the subsequent instruction are the multiplication instructions and
    when the preceding instruction and the subsequent instruction have a flow dependence relationship between them, and when the above determination is made, the preceding instruction and the subsequent instruction are fused into one instruction.

9. The method for instruction fusion calculation according to claim 7, wherein the calculation result is sent to a general-purpose register connected to a calculator which outputs the calculation result, through a reply path via a buffer.

10. The method for instruction fusion calculation according to claim 7, wherein when the number of reply paths for connecting a calculator that outputs the calculation result and a general-purpose register to which the calculation result is inputted is greater than the number of writing ports of the general-purpose register, the reply paths are aggregated so as to match the number of the reply paths with the number of the writing ports of the general-purpose register.

11. The method for instruction fusion calculation according to claim 7, wherein a plurality of calculators execute an instruction at timings different from each other when the fused instruction is executed.

12. The method for instruction fusion calculation according to claim 7, wherein the calculation result outputted by the calculator is inputted in the calculator when the fused instruction is executed to output the calculation result.

* * * * *